2,766,209

CLAY THICKENED LUBRICANTS HAVING WATER RESISTANT CHARACTERISTICS

William A. Marshall, Chicago, Ill., and Charles F. Steininger, Havertown, Pa., assignors to The Pure Oil Company, Chicago, Ill., a corporation of Ohio No Drawing. Application May 21, 1954,
Serial No. 431,585

10 Claims. (Cl. 252—49.7)

This invention relates to the thickened lubricants which have been prepared by the addition of a non-soap gelling agent. It is particularly concerned with the use of colloidal clays to produce oil dispersions of grease-like consistency having lubricating properties.

In the preparation of lubricating compositions of solid or semi-solid consistency, considerable work has been done on the development of substitutes for soap type of thickening agents. While lithium soaps permit the formulation of excellent greases, attention has also been directed to the use of various organic and inorganic non-soap materials in the manufacture of thickened lubricating compositions. Although compositions containing these non-soap gelling agents do not conform with the conventional definition of a grease, viz, an oil thickened by metallic soaps of fatty acids, to facilitate the following discussion, the expression grease will be used regardless of the type of gelling agent that is being considered.

In the preparation of greases satisfactory compositions have been prepared by employing amorphous colloids such as silica gels as well as the oxides and hydroxides of polyvalent metals such as aluminium, tin, silicon, etc., prepared in the so-called aerogel form in accordance with the teaching of Kistler in U. S. Patent 2,260,625. By stabilizing the silica aerogel thickened-base grease with additives which impart water resistance and increase the oxidation stability, a number of desirable characteristics are produced in the final product. Similar greases are also prepared by employing various hydratable clays which are hydrous alumina-silicates of the bentonite group or type. Bentonite type clays in their original condition are highly hydrophilic. When dispersed in water, they produce a thixotropic gel which has a number of uses. In order to adapt these clays for use as gelling agents in lubricating greases it is necessary to render them oleophilic and hydrophobic. The conversion to clays having these characteristics may be effected in several ways. Jordan for example in U. S. Patent 2,531,440 takes advantage of the base exchange-capacity of the clay and by reacting a bentonite type clay material with an organic base replaces the exchange cation of the clay with the cation of the organic base employed. Various types of amines are suggested for carrying out this base-exchange reaction. Another expedient, which has been suggested in the prior art by Stross in U. S. Patent 2,623,853, consists of taking a naturally occurring or synthetic clay material in its original inorganic form and adsorbing a cationic hydrophobic surface active agent on the colloidal surfaces of the clay. Surfactants employed for this use consist of nitrogen-containing compounds in which the nitrogen atoms are present in their trivalent state. The subject invention is directed to another technique which will modify the original hydrophilic condition of the clay. In the resulting modified condition the clay not only is made hydrophobic, but oleophilic properties are produced which permit the clay to be readily dispersed in an oleaginous medium to produce a thickened oil of grease-like consistency.

It is therefore an object of this invention to provide a lubricating composition of grease-like consistency which comprises an oleaginous base liquid thickened with a bentonite type of clay which has the property of swelling and dispersing in organic liquids. It is a further object of htis invention to employ a bentonite type of clay which in its normal condition is highly hydrophilic but which has been converted to a hydrophobic and organophilic clay for use in lubricating compositions. These and other objects will become apparent from the following detailed discussion of this invention.

In practicing the instant invention a lubricating composition of solid or semi-solid consistency may be prepared by employing as the gelling agent for the composition a bentonite type of clay material in which the water or moisture which is variously termed as bound, free, or interlayer water in the clay structure is replaced with a compound selected from the group consisting of diols and diol ethers. It is to be understood that this water, which hereinafter will be referred to as "bound water," which is expelled from the clay structure is that which is removed at relatively low temperatures without damaging the clay structure. The clay in this condition is not completely dehydrated because other water, which is known variously as "combined OH lattice water, or structural water," is present in the clay structure. While displacement of the former water is necessary before the clay can be further processed for use in this invention, elimination of the structural water seriously damages the clay and prevents its use in the instant invention. The removal of the bound water from the clay can be effected by heating the clay at any desirable pressure to a temperature greater than the vaporizing point of water at the selected pressure or by drying the clay over a dehydrating agent at low temperatures. In as much as the second technique is not expeditious and is of theoretical interest only, the heat treatment procedure is preferred. In carrying out the heat treatment of the clay, care must be taken to avoid the removal of structural water which would render the clay material ineffective as a gelling agent. To avoid such a mishap the clay is treated at substantially atmospheric pressure and at a temperature of about 250° F. to 650° F. until a constant weight is obtained. It is preferred, however, that the heat treating of the clay be carried out at a temperature of about 400° F. to 600° F. In carrying out this process step, about 1–10 hours is required to reach equilibrium moisture conditions at the heat treating temperature. The time employed, of course, will depend upon the quantity of material being treated, the amount of bound water in the clay, as well as the drying equipment and technique employed. The removal of bound water by dehydration at relatively low temperatures from bentonite clays as well as the loss of structural water at higher temperatures is further discussed by Ross and Hendricks, Minerals of the Montmorillonite Group, U. S. Geol. Survey Profess. Paper, 205B.

After the clay has been treated to the extent that substantially all of the bound water has been extracted from the clay structure, it is cooled and contacted with a selected diol or diol ether. This contacting may be carried out in any manner which exposes the bound waterfree clay to the diol or diol ether employed and permits the penetration of the treating reagent into the interstices of the clay structure which originally contained the bound water. One technique which provides satisfactory results involves soaking the bound water-free clay in a selected diol and/or diol ether for a time sufficient to effect the necessary impregnation. The time element required for this phase of the clay modification will again depend upon the amount of the clay being treated and the magnitude of the permeability resulting from the elimination of bound water of the clay structure. Generally the soaking period requires about one hour or more. After the clay has been thoroughly impregnated with the diol or diol ether, it is further processed by filtering and drying resulting in the production of an organophilic clay which is also hydrophobic in nature.

The clay materials which, upon being suitably modified, can be employed in carrying out this invention are those crystalline aluminum silicates of the bentonite group consisting of the montmorillonite minerals including montmorillonite, beidellite, hectorite, saponite, et al. One commercial source of these minerals is the bentonite strip mines in Eastern Wyoming. These clay minerals have sheet-like structures in which the determinative structural element is the hexagonal network. This structure makes the clays hydratable whereby water can be adsorbed and penetrate along the silicate surfaces between the adjacent sheets of bentonite. Any water retained by the clay in this manner is the above mentioned naturally occurring bound water which in accordance with this invention is replaced with a suitable liquid diol and/or diol ether. By modifying the clay mineral thuswise the original hydrophilic properties of the bentonite minerals are destroyed and a hydrophobic, oleophilic clay suitable for use as a gelling agent in the production of thickened oils having grease like consistencies is produced.

The diols or their ether derivatives which are employed in modifying the characteristics of the above described bentonite-type clay may be either monomeric or polymeric. Suitable monomers include ethanediol, propanediol, butanediol, pentanediol, etc., and their mono and dialkyl ether derivatives particularly ether derivatives of the lower alkyl groups up to 5 carbon atoms such as dimethyl ether of ethanediol, monobutyl ether of butanediol, etc. as well as other diols having about 10 carbon atoms per molecule. Suitable reagents for use in this invention are readily available from such manufacturers as Union Carbide and Carbon who market various polyhydric alcohols and their derivatives under the mark, Cellosolve. Similarly the lower molecular weight polyoxyalkylene glycols and their ether derivatives which are effective bound water substitutes include those having a molecular weight of not greater than about 800–1,000. While it is preferable to employ monomeric and polymeric treating agents which are normally in the liquid state to facilitate the modification of the clay structure, solid or semi-solid treating agents dissolved in suitable inorganic solvents may also be used, the solvent being removed during the drying of the modified clay.

Polyhydric alcohols have been used in several instances in the preparation of lubricating greases containing amorphous inorganic colloidal materials such as silica gel as the gelling agent. For example, in U. S. Patent 2,563,601, Kimberlin et al., discuss the production of a lubricating grease composition which is capable of resisting the solvent action of low boiling hydrocarbons by replacing the water of the inorganic gelling agent, e. g., silica gel, with a polyhydric alcohol such as ethylene glycol. This patent is concerned with treating dissimilar materials and there is no indication that the replacing of the bound water in a bentonite type of clay with this or other similar monomeric or polymeric polyhydric alcohols or their ether derivatives would render a bentonite type clay organophilic and hydrophobic. The prior art has also been concerned with the treating of inorganic gels such as silica with a wide variety of hydrophobic aliphatic hydroxy organic compounds having at least 8 carbon atoms in order to impart to the inorganic gel a water resistance characteristic. Included within this generic class are polyhydric alcohols and polyalkylene glycols which may be one of the end hydroxyl groups in the form of an ether or ester. Also included within this class of materials are various hydroxy fatty acids, monohydric alcohols, esters of said acids and others. In this instance, however, the hydroxy compound employed does not replace the water forming a part of the gelling agent, but apparently functions due to a modification in the surface chemistry of the amorphous colloid by means of an adsorption phenomenon. In contradistinction to the above prior art processes the instant invention is directed primarily to the modification of a bentonite type of clay, a material structurally and chemically different from the inorganic gelling agents employed in the above-mentioned patents. In addition, the replacement of the bound water of the clay material with the glycol or ether derivatives thereof in accordance with this invention is employed to render in accordance with this invention is employed to render the clay hydrophobic rather than influencing its resistance to the solvent action of lower boiling hydrocarbons. Furthermore, while all of the water in the inorganic gelling agents described by Kimberlin et al., is displaced by a suitable glycol type material, in the instant invention only the bound water is replaced without affecting the structural water which is contained in the clay structure.

To prepare a thickened oil composition employing a modified bentonite gelling agent, in accordance with this invention, a slurry of an oleaginous material and a bentonite clay is pre-mixed. The slurry is then milled in a conventional milling operation employing a colloid mill such as a Premiere colloid mill which works on the principle of a hydraulic shearing action produced in a very thick film of liquid. In preparing the bentonitic grease, the relative proportions of oleaginous liquid and gelling material will depend upon what consistency is desired in the finished product. In general products of equivalent consistency can be obtained with somewhat less bentonitic gelling agent than can be obtained when conventional soaps are employed as gelling agents. Generally about 5–25% by weight based on total composition incorporated in a suitable base oil or oleaginous vehicle will produce a lubricating composition of grease-like consistency, although amounts outside these ranges may be used in unusual circumstances.

The preferred oleaginous liquids used in this invention are those petroleum oils which are in the lubricating oil range. Any suitably refined lubricating oil which has the desired viscosity characteristics may be used such as various neutral and bright stock oils; either alone, in combination with each other or with minor amounts of mineral oil extracts obtained in the solvent refining of mineral oils with conventional selective solvents. While petroleum lubricating oil fractions are preferred as the oleaginous vehicle other oleaginous materials such as silicone fluids, diesters prepared from dicarboxylic acids, liquid polyoxyalkylene glycols or their derivatives, or mixtures thereof may be employed for certain applications where petroleum lubricating oil fractions are undesirable.

In accordance with this invention an illustrative lubricating composition having the consistency of a conventional soap containing-chassis grease is prepared by modifying the characteristics of a naturally occurring Wyoming bentonite, prior to incorporating the clay into the oleaginous liquid. To effect this modification the bentonite is first heated to a temperature of about 600° F. for about one hour. The bentonite is allowed to cool. After cooling to room temperature, the bentonite is admixed with sufficient propylene glycol to form a slurry. This slurry is continuously stirred for about one hour and a half. The clay is then filtered out of the slurry and vacuum dried at a temperature of about 150° F. The modified bentonite is then incorporated in a 100 V. I., 85 viscosity neutral oil lubricating fraction obtained from a Van Zandt crude oil to produce a composition which contained 90 parts by weight of oil and 10 parts by weight of modified bentonite. A composition of this nature has a grease-like consistency, excellent working stability and consistency-temperature characteristics.

To further illustrate the subject invention a California montmorillonite clay mineral which is first processed to remove the non-clay components is subjected to a temperature of about 500° F. for two hours to dehydrate the clay and remove the bound water. Under these conditions the structural water is retained in the clay composition. The bound water-free clay is then intimately contacted with a monomethyl ether derivative of a polyoxyalkylene glycol having a molecular weight of about 550 whereby the ether derivative is introduced into the clay structure replacing the bound water which is removed by the dehydration step. The ether-clay mixture is then filtered in a rotary vacuum filter and air dried to produce a product which can be comminuted in a hammer mill. Thus modified, the original water susceptible clay is made oleophilic and hydrophobic. A lubricating composition with a grease-like consistency having the following formula is prepared from the modified clay processed as above. This composition is water resistant and has improved oxidation resistance:

| Composition | Parts by Weight |
| --- | --- |
| Hydrophobic, oleophilic modified montmorillonite clay | 15 |
| Intermediate VI 150 viscosity bright stock lubricating oil fraction prepared from a Mid Continent crude oil | 85 |
| Oxidation inhibitor (tetramethlydiaminodiphenylmethane) | 0.4 |

While the working stability and consistency-temperature characteristics of greases prepared by employing modified bentonites as gelling agents are superior to conventional greases and the corrosivity is negligible there are several characteristics which must be enhanced or imparted to the grease to make desirable composition. Accordingly, it is desirable to incorporate a conventional oxidation inhibitor to increase the oxidation resistance of the grease. One suitable additive for this purpose is Calco M. B., tetramethyldiaminodiphenylmethane. Also useful are the dialkyl selenides, alkylated phenols, etc. Another weak characteristic of these greases is their lack of adequate rust preventative properties. However, this characteristic can be improved by the selection and use of a proper type of rust preventative such as the alkaline earth metal salts of petroleum sulfonates or other oil soluble sulfonic acid soaps, products of oxidized petroleum and their derivatives, e. g., alox composition, etc. It is known that various polar compounds while imparting anti-rust characteristics at the same time have an inimical effect on lubricating qualities. It is therefore necessary to judiciously select and test rust preventatives for this application. It may also be desired to employ an extreme pressure additive to enhance the wear characteristics of the greases of this invention. Conventional sulfur and/or phosphorus containing materials may be used for this purpose.

The foregoing discussion of this invention is intended to illustrate the principle of the instant invention. Other modifications which are not herein specifically set forth will be obvious to those who are skilled in this art. Any such modifications are considered within the purview of this invention.

What is claimed as this invention is:

1. A gelatinous composition having lubricating characteristics which comprises a major portion of an oleaginous lubricating fluid having incorporated therein an oleophilic and hydrophobic modified bentonitic clay in an amount sufficient to impart a grease-like consistency to said composition, said clay being modified before being incorporated into said lubricating fluid by (1) treating said clay to remove substantially all of the bound water naturally occurring therein without affecting the structural water content of said clay, and (2) replacing the bound water naturally occurring in a bentonitic clay with a treating agent selected from the group consisting of monomeric diols having not more than about 10 carbon atoms per molecule $C_1$–$C_5$ ether derivatives of said diols, polymeric diols and ether derivatives thereof said diols and their ether derivatives having molecular weights of not more than about 800–1000.

2. A composition in accordance with claim 1 in which said treating agent employed is a monomeric diol having not more than about 10 carbon atoms per molecule.

3. A composition in accordance with claim 2 in which said diol is ethane diol.

4. A gelatinous composition having lubricating characteristics which comprises a major portion of a petroleum oil lubricating fraction having incorporated therein an oleophilic and hydrophobic modified bentonitic clay in an amount sufficient to impart a grease-like consistency to said composition, said clay being modified prior to being incorporated in said lubricating fraction by heat-treating at an elevated temperature a hydratable bentonitic clay to remove substantially all of the bound water naturally occurring therein without affecting the structural water content of said clay to produce a bound water-free clay, contacting bound water-free clay with a treating agent selected from the group consisting of monomeric diols having not more than about 10 carbon atoms per molecule, $C_1$–$C_5$ ether derivatives of said diols, polymeric diols and ether derivatives thereof said diols and their ether derivatives having molecular weights of not more than about 800–1000 in an amount sufficient whereby the said liquid is adsorbed in said bound water-free clay structure replacing said bound water, and drying said liquid containing clay to produce said modified bentonitic clay.

5. A composition in accordance with claim 4 in which said hydratable bentonitic clay has been heat-treated at a temperature of about 400° to 650° F.

6. A composition in accordance with claim 4 in which said liquid is a monomeric diol having not more than about 10 carbon atoms per molecule.

7. A composition in accordance with claim 6 in which said diol is ethanediol.

8. A composition in accordance with claim 6 in which said diol is propanediol.

9. A gelatinous composition having lubricating characteristics which comprises a major portion of a petroleum oil lubricating fraction having incorporated therein 5 to 25 percent by weight, based on the total composition, of an oleophilic and hydrophobic modified bentonitic clay whereby a grease-like consistency is imparted to said composition, said clay being modified before being incorporated into said lubricating fraction by treating a bentonitic clay to remove the bound water naturally occurring therein without affecting the structural water content of said clay to produce a clay substantially free from bound water, and replacing the bound water naturally occurring in a bentonitic clay with treating agent selected from the group consisting of monomeric diols having not more than about 10 carbon atoms per molecule, $C_1$–$C_5$ ether derivatives of said diols, polymeric diols and ether derivatives thereof said diols and their ether derivatives having molecular weights of not more than about 800–1000.

10. A composition in accordance with claim 9 which contains tetramethyldiaminodiphenylmethane in an amount sufficient to impart oxidation resistance to said composition.

References Cited in the file of this patent

UNITED STATES PATENTS

| 2,563,606 | Kimberlin et al. | Aug. 7, 1951 |
| 2,573,650 | Peterson | Oct. 30, 1951 |
| 2,647,872 | Peterson | Aug. 4, 1953 |